US010480603B2

(12) United States Patent
Yu et al.

(10) Patent No.: US 10,480,603 B2
(45) Date of Patent: Nov. 19, 2019

(54) SHOCK ABSORBER BASED ON THE CUTTING, INWARD-FOLDING AND CRUSHING OF COMPOSITE TUBE

(71) Applicant: SHANGHAI JIAOTONG UNIVERSITY, Shanghai (CN)

(72) Inventors: Zhefeng Yu, Shanghai (CN); Yi Fu, Shanghai (CN)

(73) Assignee: SHANGHAI JIAOTONG UNIVERSITY, Shanghai (CN)

(*) Notice: Subject to any disclaimer, the term of this patent is extended or adjusted under 35 U.S.C. 154(b) by 0 days.

(21) Appl. No.: 15/923,833

(22) Filed: Mar. 16, 2018

(65) Prior Publication Data
US 2018/0202505 A1 Jul. 19, 2018

Related U.S. Application Data

(63) Continuation of application No. PCT/CN2017/073713, filed on Feb. 16, 2017.

(30) Foreign Application Priority Data

Jun. 2, 2016 (CN) .......................... 2016 1 0383505

(51) Int. Cl.
F16F 7/12 (2006.01)
F16F 7/00 (2006.01)
(Continued)

(52) U.S. Cl.
CPC .............. F16F 7/003 (2013.01); B60R 19/02 (2013.01); B61F 19/04 (2013.01); F16F 7/123 (2013.01);
(Continued)

(58) Field of Classification Search
CPC .......... F16F 7/123; B60R 19/02; B60R 19/26; B60R 19/40
(Continued)

(56) References Cited

U.S. PATENT DOCUMENTS 5,875,875 A * 3/1999 Knotts .................... B60R 19/34
188/268
6,062,355 A 5/2000 Nohr et al.
(Continued)

FOREIGN PATENT DOCUMENTS

CN 201980172 U 9/2011
CN 103818402 A 5/2014
(Continued)

OTHER PUBLICATIONS

International Search Report (English and Chinese) and Written Opinion issued in PCT/CN2017/073713 dated May 12, 2017.

Primary Examiner — Christopher P Schwartz
(74) Attorney, Agent, or Firm — Hamre, Schumann, Mueller & Larson, P.C.

(57) ABSTRACT

The present invention relates to an shock absorber based on the cutting, inward-folding and crushing of composite tube, comprising a destructing cap, a flat-pressing cap, a cutter and a positioning tube. The cutter is positioned in the destructing cap, and has a lower end connected to an inner flange of the destructing cap and an upper end connected to the positioning tube. The positioning tube is positioned in the destructing cap and closely connected to the inner wall of the destructing cap, and has a lower surface in contact with the cutter. The destructing cap, the positioning tube and the composite tube are respectively provided with aligned pin holes, and bound together with a pin. Energy is absorbed through destruction generated due to cutting and inward-folding of the composition tube. Energy can also be absorbed through destruction generated due to the inward-folding of the composite tube, without using the cutter. Compared to existing technology, the device may be used as a structural component in a normal working state. In the colliding and crushing state, the device fully destructs the composite. The present invention has the following advan-
(Continued)

tages: the energy-absorption ratio is high; and the energy absorbing device only bears an axial force in the process that the composite is being destroyed, does not bend or rupture, keeps the structure stable, and avoids spattering of scraps.

8 Claims, 6 Drawing Sheets

(51) Int. Cl.
  *B61F 19/04* (2006.01)
  *B60R 19/02* (2006.01)

(52) U.S. Cl.
  CPC .............. *F16F 7/124* (2013.01); *F16F 7/126* (2013.01); *F16F 7/127* (2013.01); *F16F 2224/0241* (2013.01); *F16F 2230/0052* (2013.01); *F16F 2236/04* (2013.01)

(58) Field of Classification Search
  USPC ........ 188/371, 372, 376, 377, 374; 293/118, 293/119, 130–133; 296/187.03, 187.09
  See application file for complete search history.

(56) References Cited

U.S. PATENT DOCUMENTS

| | | | | |
|---|---|---|---|---|
| 6,189,941 B1* | 2/2001 | Nohr | ...................... | B60R 19/40 188/371 |
| 6,668,989 B2* | 12/2003 | Reid | ..................... | E01F 15/148 188/377 |
| 6,840,128 B1* | 1/2005 | Shioya | ..................... | F16F 7/125 280/777 |
| 8,814,235 B2* | 8/2014 | Haneda | ................... | F16F 7/123 293/133 |
| 8,820,493 B2* | 9/2014 | Panda | ................... | B61G 11/12 188/268 |
| 9,482,303 B2* | 11/2016 | Panda | ..................... | B61G 11/12 |
| 2003/0209915 A1* | 11/2003 | Yoshida | ................. | B60R 19/34 293/133 |
| 2003/0222477 A1* | 12/2003 | Yoshida | ................. | B60R 19/34 296/187.03 |

FOREIGN PATENT DOCUMENTS

| | | |
|---|---|---|
| CN | 105034998 A | 11/2015 |
| CN | 105905056 A | 8/2016 |
| IE | 19803156 C1 | 8/1999 |

\* cited by examiner

A-A

SHOCK ABSORBER BASED ON THE CUTTING, INWARD-FOLDING AND CRUSHING OF COMPOSITE TUBE

BACKGROUND OF THE INVENTION

Technical Field

The present invention relates to the technical field of energy absorption structures, and particularly to A shock absorber based on the cutting, inward-folding and crushing of composite tube.

Description of the Related Art

Lower crashworthy structures of modern commercial airplanes and the anti-collision beams of vehicles are commonly made of metal materials. The energy generated by impact destruction is usually absorbed through plastic deformations. Limited by the metal materials, the ratio of the absorbed energy to the structural weight is relatively low. A composite structure is light, so more energy can be absorbed. S. Heimbs proposed a solution in which the composite is cut into a plurality of slim strips using connectors such that the composite generates a relatively complicated destruction form to absorb energy. However, during the implementation of this solution, the cut strips expand towards the outside of a cap, extend towards the four sides, and are wound around the cap, generating a relatively large disturbance and influencing the surrounding structures. Moreover, carbon fiber tubes generate a huge amount of scraps and fine fibers after being torn off and crushed, imposing an adverse effect on the surroundings. Structural components for absorbing energy through destruction have a relatively large improvement space in design.

BRIEF SUMMARY OF THE INVENTION

The purpose of the present invention is to provide an efficient shock absorber based on the cutting, inward-folding and crushing of composite tube to overcome the above mentioned defects in existing technologies, which has a simple overall structure and can play a structural support role at the same time. Based on a composite tube, the device absorbs impact energy through layering, bending, shearing, fiber breaking and base destruction of the composite tube. Moreover, the destroyed fibers are compressed and then filled into a hollow cavity of the composite tube to further absorb energy and strengthen the rigidity of the tube, thus improving the interaction force, avoiding spattering of the generated scraps, and avoiding influence on the surrounding structures or environment.

The objective of the present invention can be fulfilled by the following technical solution:

A shock absorber based on the cutting, inward-folding and crushing of composite tube which includes a destructing cap, a flat-pressing cap, a cutter and a positioning tube. The cutter is positioned in the destructing cap, and has a lower end connected to an inner flange of the destructing cap and an upper end connected to the positioning tube. The positioning tube is positioned in the destructing cap and closely connected to the inner wall of the destructing cap, and has a lower surface in contact with the cutter, where a composite tube to be processed is fixed above the positioning tube.

The destructing cap, the positioning tube and the composite tube are respectively provided with aligned pin holes, and bound together with a pin. The pin bears a shearing force under impact load. If the strength of the pin is lower than the strength of the composite tube, the pin will be sheared off, and the composite tube will be pressed into the destructing cap. If the pin is strong enough, the pin will cut the composite tube into a plurality of strips.

The destructing cap comprises a, a lug, an inlet radius, a flange and a guide curved face.

The inlet radius is positioned at the upper end of the destructing cap to guide the composite tube to be inserted into the destructing cap.

The lug is positioned at the lower end of the destructing cap to be connected to an external structure.

The flange is positioned in the destructing cap, and is directly connected to the cutter to fix the lower surface of the cutter.

The guide curved face is positioned in the destructing cap, and when the composite tube is cut into strips by the cutter, the strips guided by the guide curved face move towards the inner cavity of the composite tube along the guide curved face. Energy is absorbed by means of tearing, bending, delaminating, crack of matrix, fiber breaking, friction, etc. When the composite strips reach the inner surface of the flat-pressing cap, the output load rises, and the energy is further absorbed by compressing the composite strips.

The cutter comprises variable cross-section holes, a reinforcing ring and a guide fillet.

The variable cross-section holes are circumferentially arranged to form an upward cutting edge that is axially driven to move axially, and the reducing cross sections extrude the strips, thereby further absorbing energy. The cutting edge is formed by crossing variable cross-section holes, with the edge upward for cutting the composite tube that is driven by an axial force to move axially.

The reinforcing ring is connected to the circles of all variable cross-section holes for reinforcing the cutting edges.

The guide fillet enables the strips to more easily pass through the reinforcing ring when the torn composite strips turn upward, so that the destructed composite tube is stored in the inner wall cavity of the tube.

The destructing cap is provided with a pin hole.

The positioning cap includes an upper chamfer and a pin hole; the pin hole corresponds to the pin hole on the destructing cap; and the composite tube, the positioning tube and the destructing cap are bound together with a pin.

A flat-pressing cap is also included, and the flat-pressing cap is connected to the other end of the composite tube.

The flat-pressing cap has one end with a lug structure which is connected to an external structure; the flat-pressing cap has a groove for flat pressing the end face of the composite tube; and a side wall of the outer edge is formed with a pin hole for connecting and fixing the composite tube, so that the structure bears a certain pull force.

The destructing cap is also capable of being provided with no cutter inside, and the inner diameter of the destructing cap is identical with the outer diameter of the composite tube such that the composite tube is in direct contact with the inner wall of the destructing cap. The composite tube turns inwards along the guide curve face of the destructing cap. Energy is absorbed by means of bending, delaminating, crack of matrix, fiber breaking, friction, etc. When the composite tube reaches the inner surface of the flat-pressing cap, the output load rises, and energy is further absorbed by compressing the composite strips.

The output load rises quickly after the inside-turned composite reaches the flat-pressing cap, which goes against application in some circumstances. Then, the combined energy absorbing device can be adopted, which reduces the peak load value, thus improving the material utilization rate.

Compared with the prior art, the present invention adopts novel composite destruction type energy absorption and a more ingenious structural design. When the energy absorbing device is impacted along the axial direction of the tube, the composite tube moves axially to extrude the cap. After the pin fails, the tube is cut by the cutter. The purpose of absorbing the impact energy is fulfilled through destruction where the composite tube is cut into strips and then the strips are extruded by the variable cross-section holes. The torn strips can enter the tube via the holes on the tube, and the output force remains stable before the strips reach the flat-pressing cap at the other end. The destroyed tube material is compressed and filled into the tube, to ensure further energy absorption and to increase the tube strength without affecting the surrounding structures. Under normal conditions, the energy absorbing device can be used as a structural component, and when the structure is impacted, the energy absorbing device can serve as an energy absorbing unit to play a role of protecting the structural body or the carrier.

DETAILED DESCRIPTION OF THE INVENTION

The present invention is described in detail with reference to the attached drawings and Example. The following Examples will help those skilled in the art to further understand the present invention, without limiting the present invention in any form. It should be noted that, for those ordinarily skilled in the art, various modifications and improvements can be made on the basis of the concept of the present invention, which all fall within the protective scope of the present invention.

Example 1

Figure 1:
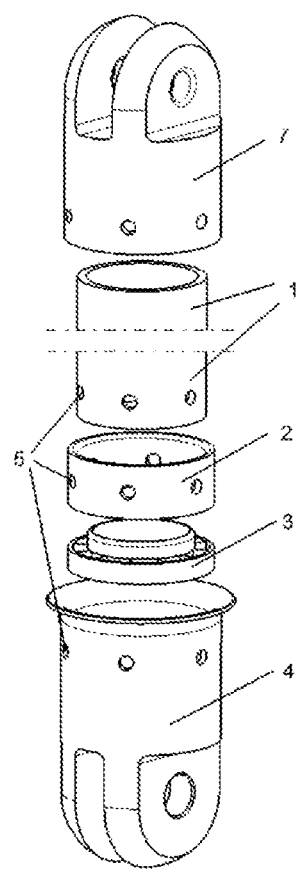
FIG. 1 is an exploded structural view of the present invention.

An shock absorber based on the cutting, inward-folding and crushing of composite tube, with a structure as shown in FIG. 1, including a composite tube 1, a destructing cap 4, a flat-pressing cap 7, a cutter 3 and a positioning tube 2. The cutter 3 is installed in the destructing cap, and has a lower end connected to an inner flange 9 of the destructing cap and an upper end connected to the positioning tube 2. The positioning tube 2 is positioned in the destructing cap, and has a lower surface in contact with the cutter 3. The destructing cap, the positioning tube 2 and the composite tube 1 are respectively provided with aligned pin holes 5, and bound together with a pin; and the other end of the composite tube is connected with the flat-pressing cap 7 through a pin.

Figure 2:
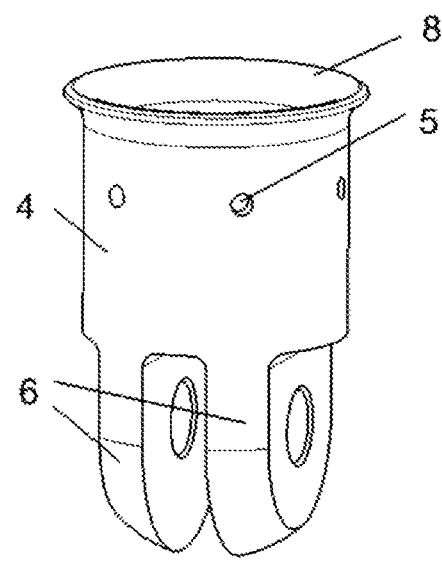
FIG. 2 is a structural view of a destructing cap.
Figure 3:
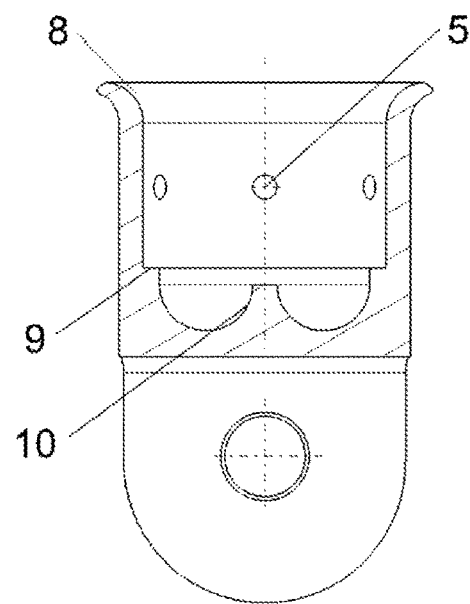
FIG. 3 is a sectional structural view of the destructing cap.

The destructing cap 4, with a structure as shown in FIG. 2-3, includes a lug 6, an inlet radius 8, a flange 9 and a guide curved face 10. The inlet radius 8 is positioned at the upper end of the destructing cap 4 to guide the composite tube 1 to be inserted into the destructing cap, to avoid the composite tube from breaking due to concentrated force caused by the destructing cap during the crushing process. The destructing cap 4 is directly connected to the cutter 3 and the positioning tube 2, and has pin holes 5 for fixing and connecting the destructing cap 4, the positioning tube 2 and the composite tube 1.

The lug 6 is connected to an external structure. The flange 9 is positioned in the destructing cap 4, and is directly connected to the cutter 3 to fix the lower surface of the cutter 3. The guide curved face 10 is positioned in the destructing cap 4. After the composite tube 1 is cut into strips, the strips guided by the guide curved face 10 move towards the inner cavity of the composite tube along the guide curved face 10, so the destructed tube body does not affect the surrounding structures, and the tube body which is fully filled in can further strengthen the energy absorbing capability. The pin holes 5 are formed on the destructing cap 4.

Figure 4:
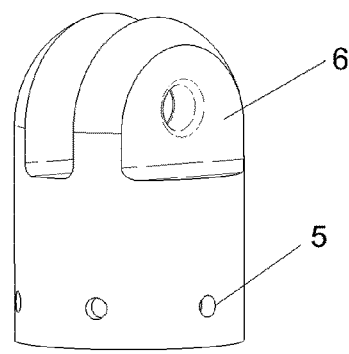
FIG. 4 is a structural view of a flat-pressing cap.
Figure 5:
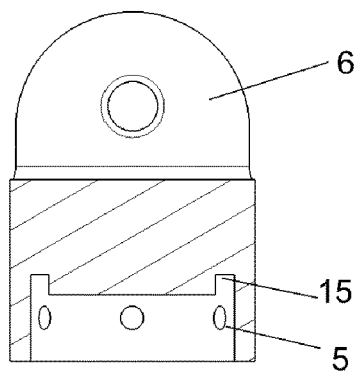
FIG. 5 is a sectional structural view of the flat-compressing cap.

The structure of the flat-pressing cap 7 can be seen in FIG. 4-5. The flat-pressing cap 7 is installed at the other end of the composite tube 1. The cap has one end with a lug structure which is connected to an external structure, and has a groove 15 inside for flat-pressing the end face of the composite tube. The side wall of the outer flange of the cap is formed with a pin hole 5 for connecting and fixing the composite tube 1, so that the structure can bear a certain pull force.

Figure 6:
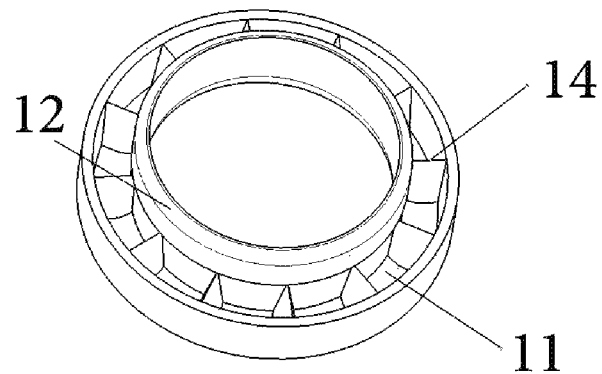
FIG. 6 is a structural view of a cutter.
Figure 7:
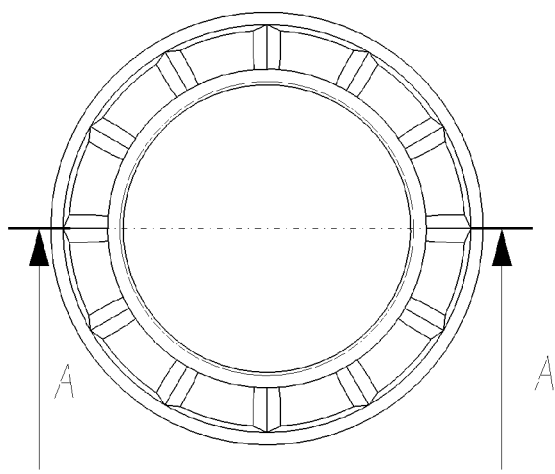
FIG. 7 is a top structural view of the cutter.
Figure 8:
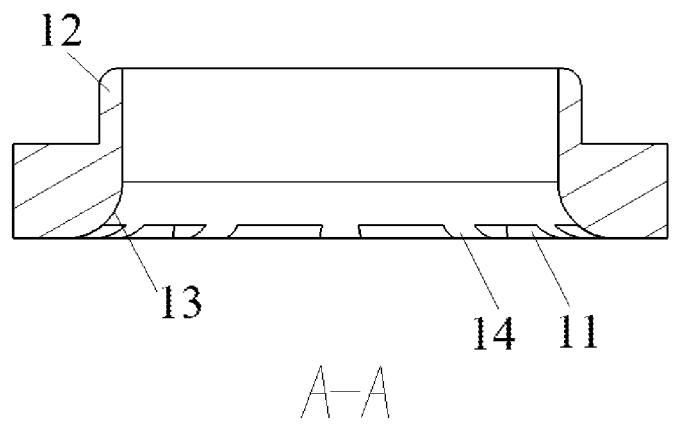
FIG. 8 is a structural view of FIG. 7 in direction A-A.

The cutter 3, with a structure as shown in FIG. 6-8, includes variable cross-section holes 11, a reinforcing ring 12 and a guide fillet 13. The variable cross-section holes 11 are circumferentially arrayed to form a cutting edge 14 with an upward edge. The lower part of the cutting edge has a certain thickness to ensure the strength of the edge. At the same time, the gradually reducing variable cross sections extrude the cut composite strips to absorb the impact energy. The cutting edge 14 cuts the composite tube which moves axially. The reinforcing ring 12 is connected to the inner and outer ends of the variable cross-section holes 11 to support the cutting edge and ensure that the cutter has certain strength to avoid breakage. The guide fillet 13 enables the cut composite strips to more easily pass through the reinforcing ring when the strips turn upward, so that the destroyed composite tube is stored in the inner wall cavity of the tube.

The positioning cap 2 includes an upper chamfer and a pin hole; the pin hole corresponds to the pin hole on the destructing cap; and the composite tube, the positioning tube and the destructing cap are bound together with a pin. The upper chamfer makes the installation of the composite tube more convenient. The positioning tube has an outer side connected to the inner side of the destructing cap, and a lower surface connected to the cutter, and together with the flange of the cap, prevents the cutter from moving axially, thus covering the most outer edge of the cutter while fixing the cutter, ensuring direct contact between the composite tube and the cutting edge, and facilitating the cutting and destruction of the composite tube.

Figure 9:
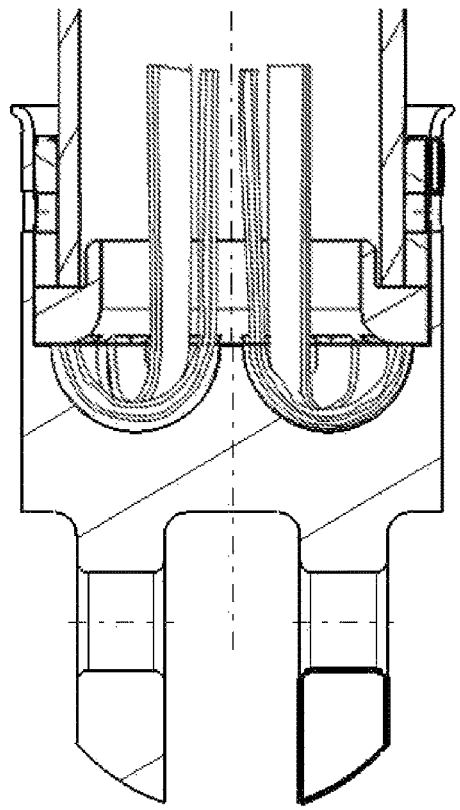
FIG. 9 is a schematic diagram of the present invention.

For the energy absorbing device adopted in this Example, the schematic view of the working process thereof can be seen in FIG. 9. When the whole device bears the axial impacting destruction, the composite tube receives a relatively large axial load, and then starts to extrude the lower cap. First, the pin fails. The composite tube continuously moves toward the axial direction to extrude the cutter, and then is cut into strips by the cutting edge. When the strips pass through the variable cross-section holes, the strips are further destroyed by the extrusion effect and are continuously bent. At the same time, the composite strips change direction during movement when guided by the guide curved face 10 at the bottom of the destructing cap, and then the move towards the inner hollow cavity of the composite tube. The guide chamfer below the reinforcing ring of the cutter can make the reverse movement of the torn strips easier, so that the destroyed parts of the composite tube are extruded and filled into the inner cavity of the tube, thus making a full use of the space. After the length of the inward folding portion reaches residual length, the inside-folding portion contacts the flat-pressing cap, and is gradually compressed, further absorbing the impact energy, and also avoiding the destroyed tube structure from affecting the surrounding structures or environment.

Example 2

Figure 10:
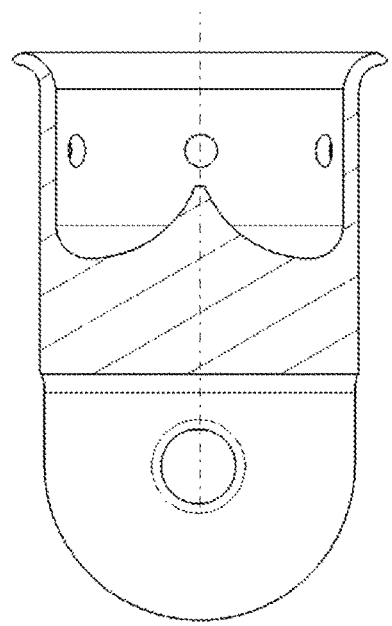
FIG. 10 is a structural view of a destructing cap of the present invention without the cutter.
Figure 11:
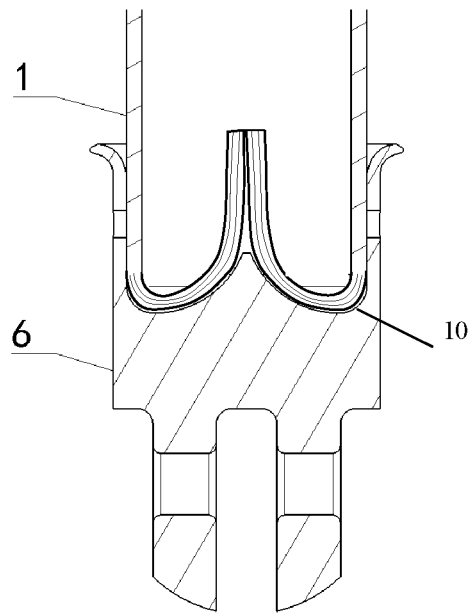
FIG. 11 is a schematic diagram of the cutter-free solution adopted by the present invention.

The destructing cap may be in another form. As shown in FIG. 10, the destructing cap is also capable of being provided with no cutter inside, and the inner diameter of the destructing cap is identical with the outer diameter of the composite tube such that the composite tube is in a direct contact with the inner wall of the destructing cap. For the energy absorbing device adopted in this example, the schematic view of the working process thereof can be seen in FIG. 11. The cutter is removed. The inner diameter of the destructing cap is reduced to be equal to the outer diameter of the composite tube, so that the composite tube directly contacts the inner wall of the destructing cap. When bearing an axial load, the composite tube starts to extrude the lower cap. First, the pin fails. Then, the composite tube continuously moves towards the axial direction until reaching the guide curved face 10 in the destructing cap, and changes direction during movement when guided by the guide curve face 10, and moves towards the inner hollow cavity of the composite tube 1. During the folding process, layering destruction and fiber bending destruction occur, and the destroyed parts are all extruded and filled into the hollow cavity. In this process, the composite absorbs energy. At the same time, tube wall bending, friction and fiber breaking also occur, which absorbs energy. This solution features a simpler structure, higher reliability and high energy-absorption ratio.

Figure 12:
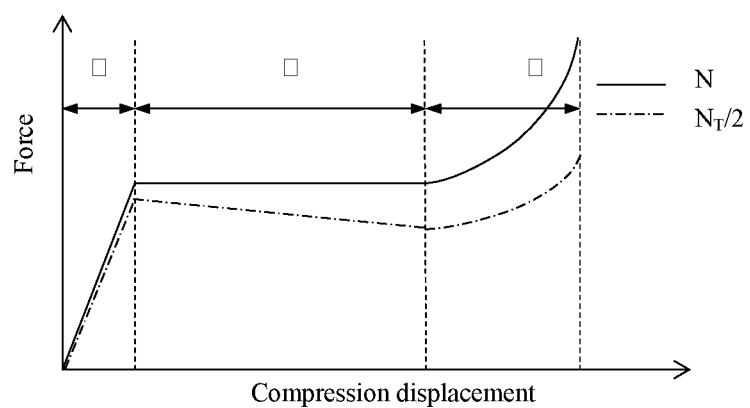
FIG. 12 is a curve of relation between the displacement and axial load of the present invention.

Regarding the calculation of the energy absorption when the device bears an axial external load, the displacement-load curve can be seen in FIG. 12. Stage I shows the process where the composite tube 1 is gradually compressed and starts to folding inward. Stage II shows the process where the composite tube 1 turns inward. Stage III shows that the inward-folding portion of the composite tube 1 contacts the flat-pressing cap 7 and then is gradually compressed after the length thereof reaches the residual length, so the load rises gradually. The majority of the energy is absorbed in Stage II by means of layering, tube wall bending, friction, fiber breaking and matrix destruction. In Stage III, the material destruction form is relatively complicated. The composite is fully crushed and compressed in this process.

Figure 13:
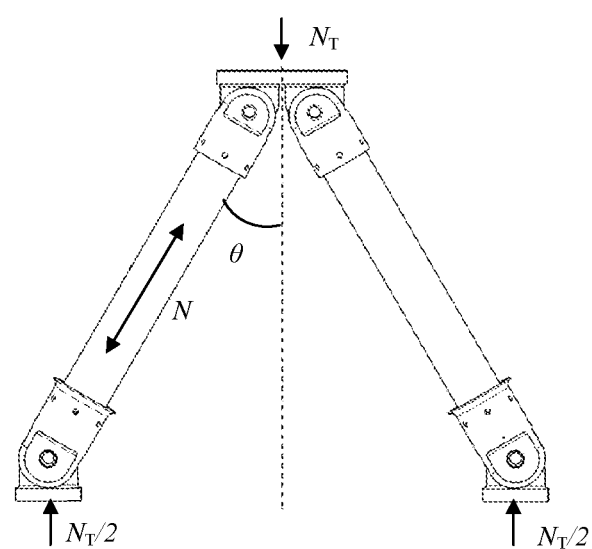
FIG. 13 is a schematic view of a combined energy absorbing structure of the present invention.
Guide: 1—composite tube, 2—positioning tube, 3—cutter, 4—destructing cap, 5—pin hole, 6—lug, 7—flat—pressing cap, 8—inlet radius, 9—flange, 10—guide curved face, 11—variable cross-section hole, 12—reinforcing ring, 13—guide fillet, 14—cutting edge, 15—groove.

The present invention provides an application. The output load of the present invention rises in Stage III, so that in some circumstances, a high load is hazardous to the structure or to people. If Stage III is not utilized, the energy absorption efficiency will be relatively low. Therefore, the combined device as shown in FIG. 13 can be adopted, where two support points are fixed, and the upper connecting point is pressed to move downward. The relation between the total output force $N_T$ and the force N of a single rod is $$N_T = 2N \cos(\theta) \quad (6)$$

As the upper connecting point moves downward, the rod is gradually shortened, and the angle θ gradually increases. In such a circumstance, the output force of each rod is $0.5N_T$, and the form can be seen in FIG. 12. In this way, the load value is relatively stable during the whole downward movement process, and the energy absorption performance in Stage III is fully used.

The above are detailed descriptions of the specific examples of the present invention. It should be understood that the present invention is not limited to the above specific examples. Those skilled in the art can made various changes and modifications within the scope of the claims, without affecting the substantial content of the present invention.

What is claimed is:

1. A shock absorber having operation based on cutting, inward-folding and crushing of a composite tube, comprising:
   an energy absorbing device that comprises a destructing cap, a flat-pressing cap, a cutter and a positioning tube;
   wherein the cutter is positioned in the destructing cap and has a lower end connected to an inner flange of the destructing cap and an upper end connected to the positioning tube;
   the positioning tube is positioned in the destructing cap, connected to the inner wall of the destructing cap, and has a lower surface in contact with the cutter, where the composite tube is fixed above the positioning tube; and
   the destructing cap, the positioning tube and the composite tube are respectively provided with aligned pin holes, and bound together with a pin.

2. The shock absorber according to claim 1, wherein the destructing cap comprises a lug, an inlet radius, a flange and a guide curved face;
   the inlet radius is positioned at the upper end of the destructing cap to guide the composite tube to be inserted into the destructing cap;
   the lug is positioned at the lower end of the destructing cap to be connected to an external structure;
   the flange is positioned in the destructing cap, and is directly connected to the cutter to fix the lower surface of the cutter;
   the guide curved face is positioned in the destructing cap, and when the composite tube is cut into strips by the cutter, the strips guided by the guide curved face move towards the inner cavity of the composite tube along the guide curved face.

3. The shock absorber according to claim 2, wherein the destructing cap is provided with a pin hole.

4. The shock absorber according to claim 3, wherein the positioning cap includes an upper chamfer and a pin hole; the pin hole corresponds to the pin hole on the destructing cap; and the composite tube, the positioning tube and the destructing cap are bound together with a pin.

5. The shock absorber according to claim 1, wherein the cutter comprises variable cross-section holes, a reinforcing ring and a guide fillet;

the variable cross-section holes are circumferentially arrayed to form an upward cutting edge for cutting the composite tube that is axially driven to move axially, and the gradually reducing cross sections extrude the strips, thereby further absorbing energy;

the reinforcing ring is connected to the circles of all variable cross-section holes for reinforcing the cutting edges;

and the guide fillet enables the strips to more easily pass through the reinforcing ring when the torn composite strips turn upward, so that the destructed composite tube is stored in the inner wall cavity of the tube.

6. The shock absorber according to claim 1, further comprising a flat-pressing cap, and the flat-pressing cap is connected to the other end of the composite tube.

7. The shock absorber according to claim 6, wherein the flat-pressing cap has one end with a lug structure which is connected to an external structure; the flat-pressing cap has a groove for flat pressing the end face of the composite tube without destruction of the composite tube; and a side wall of the outer edge is formed with a pin hole for connecting and fixing the composite tube, so that the structure bears a certain pull force.

8. The shock absorber according to claim 1, wherein the destructing cap is also capable of being provided with no cutter inside, and the inner diameter of the destructing cap is identical to the outer diameter of the composite tube such that the composite tube is in direct contact with the inner wall of the destructing cap.

\* \* \* \* \*